(12) United States Patent
Shaffer et al.

(10) Patent No.: US 6,226,375 B1
(45) Date of Patent: May 1, 2001

(54) COMMUNICATION SYSTEM INCLUDING DIGITAL ERROR MESSAGE DETECTION

(75) Inventors: Shmuel Shaffer, Palo Alto; William J. Beyda, Cupertino, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 08/892,965

(22) Filed: Jul. 16, 1997

(51) Int. Cl.[7] .................................................. H04M 3/424
(52) U.S. Cl. ........................ 379/213; 379/142; 379/354; 379/93.23
(58) Field of Search ............................... 379/88.2, 88.21, 379/88.08, 88.09, 142, 88.27, 352–359, 88.01, 88.02, 88.04, 213, 93.01, 93.17, 93.1, 93.23, 100.06; 455/414, 415, 417

(56) References Cited

U.S. PATENT DOCUMENTS

| | | |
|---|---|---|
| 5,259,026 | 11/1993 | Johnson . |
| 5,325,425 | 6/1994 | Novas et al. . |
| 5,608,788 * | 3/1997 | Demlow et al. ........................ 379/142 |
| 5,636,267 | 6/1997 | Utsumi et al. . |
| 5,644,625 * | 7/1997 | Solot ........................................ 379/88 |
| 5,732,132 * | 3/1998 | Hamada ................................. 379/354 |
| 5,764,731 * | 6/1998 | Yablon ..................................... 379/88 |
| 5,852,657 * | 12/1998 | Malik et al. ......................... 379/93.25 |

OTHER PUBLICATIONS

U.S. application Serial No. 08/853,977, Robert Joseph Levay et al., filed May 9, 1997, entitled "Speech and Text Messaging System".

* cited by examiner

Primary Examiner—Scott L. Weaver (57) ABSTRACT

A communication system (70) for transmitting voice or data signals to a remote receiver detects a digital error message that is transmitted by a telephone service provider. A Caller_ID processor (80) detects and decodes the digital error messages that are transmitted on an analog telephone line. A central processing unit (180) detects and decodes the digital error messages that are transmitted on a signaling or D-channel of a digital telephone line. Once the received error messages are decoded, they are analyzed by the communication system for the appropriate action to take in order to complete a telephone call.

15 Claims, 6 Drawing Sheets

COMMUNICATION SYSTEM INCLUDING DIGITAL ERROR MESSAGE DETECTION

FIELD OF THE INVENTION

The present invention relates to communication systems in general, and in particular to telephonic data transmission systems such as facsimile machines or modems.

BACKGROUND OF THE INVENTION

With advances in high speed data transmission techniques, systems for transmitting data via telecommunication links have become ubiquitous in the modern office environment. Data transmission systems such as facsimile machines or modems provide the ability to transmit data or documents around the world within minutes rather than the hours or days required to deliver them via conventional methods such as by courier or through the mail.

Most data transmission systems operate under the control of a computer processor without human supervision. For example, most facsimile machines can scan and store a plurality of documents in their internal memory and transmit them sequentially to a predetermined or specially entered telephone number. While this process generally works well, currently existing facsimile machines cannot recover from an error in the telephone number of the called party or receiving facsimile machine.

Currently, the most common method of informing a user that a problem has occurred with the number dialed is to use an informational error message that is played by the telephone service provider. Such messages are usually preceded with a series of "alert tones" that have a predefined frequency or pitch. For example, when the telephone number of a desired party or receiving facsimile machine has been changed, the informational message is usually something like: "The number you have reached has been changed. The new number is 555-1234. Please make a note." Despite the fact that an informational message is played by the telephone service provider, currently available computerized data transmission systems cannot interpret the message and will continue to dial the original number again and again before terminating with an indication that a connection was not possible. If a human operator is not available to correct the problem, there is a chance that the data to be transmitted will never reach the intended recipient.

Given the shortcomings in prior art computer-based data transmission systems, there is a need for a data transmission system that can detect and respond to an error in a telephone call in order to increase the speed and accuracy with which data are transmitted.

SUMMARY OF THE INVENTION

The present invention is a data communication system that can detect and respond to errors that occur when a telephone call is placed. In one embodiment of the invention, a telephone service provider transmits a digital error message that describes the nature of the problem with the call. A decoder in the communication system is programmed to decode the digital error message and take the appropriate action such as redialing or changing the telephone number, etc. The decoder preferably comprises a Caller_ID processor if the telephone call is transmitted on an analog telephone line or a digital signal processor that decodes packets on a signaling or D-channel if the telephone line is a digital telephone line.

Although the present invention is primarily for use with computerized data transmission systems, such as facsimile machines or modems, the present invention can also be used in other communication systems, such as conventional or cellular telephones, where it is often difficult or inconvenient for a user to make a note of the error described in an audible informational error message.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a communication system that decodes and interprets digital error messages that are transmitted by a telephone service provider in order to indicate that there is a problem with a telephone call. The digital error message is analyzed by the communication system so that corrective action can be taken and the call can be connected.

Figure 1A:
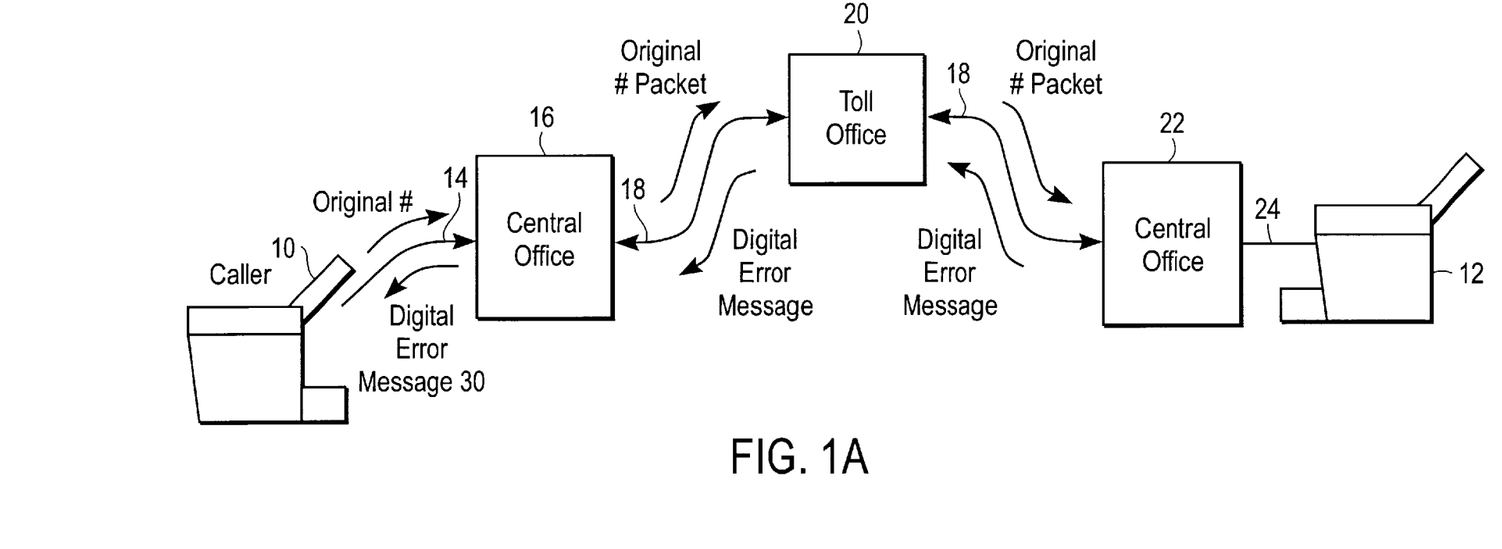
FIG. 1A illustrates a communication system that is configured according to the present invention.

FIG. 1A illustrates a communication system that is constructed according to the present invention. In the example shown, a calling station 10 is a facsimile machine that transmits data to a receiving station 12. Data from the calling station are transmitted on a telephone line 14 to a central office 16. From the central office, the data are transmitted on one or more communication links 18 through one or more toll offices 20 en route to a central office 22 that is connected to the receiving station 12. The topology shown in FIG. 1A is only illustrative of a variety of network topologies. For example, calling station 10 and the receiving station 12 may be connected to the same central office.

The process of transmitting data to the receiving station begins by placing the telephone line 14 in an "off hook" state. A telephone number of the receiving station is transmitted on the telephone line 14 as a series of pulses, DTMF tones, or as a digital data packet. The particular format used to transmit information between the calling station 10 and the central office 16 depends on whether the telephone line 14 is an analog or digital line.

Communication between the central office 16 and the central office 22 typically takes place in a protocol that differs from the protocol used between a central office and the calling or receiving station. For example, one common interoffice protocol is Signaling System Number 7. The communication links 18 generally comprise high-speed data links, which may incorporate wireless or satellite-based systems. Upon receipt of the data on the high-speed communication link 18, the central office 22 converts the data to the appropriate protocol for transmission over a telephone line 24 to the receiving station 12.

As indicated above, there are many situations in which a call placed from the calling station 10 cannot reach the receiving station 12 due to an error in the number dialed, an overload in the communication system's capacity, etc. For example, if the number of the receiving station 12 has been changed, the central office 22 will often transmit an audible informational message that recites the receiving station's new telephone number. Often these informational messages are composed of a series of "alert tones" having a predefined pitch and duration followed by an audible message indicating the problem with the dialed number. For example, if the receiving station is outside the calling station's local area code, an informational message may state "We're sorry, it is first necessary to dial a one before reaching this number."

When the calling station 10 is an automated device such as a facsimile machine or modem, there may be no human operator available to hear the informational message and update or redial the telephone number as required. Therefore, it is possible that the calling station will attempt to repeatedly dial the same incorrect number before printing an error message indicating that a connection to the receiving station was not possible.

The present invention provides the ability for the calling station 10 to interpret the error message by requiring that the central office 22 transmit a digital error message that can be decoded by the calling station. In the presently preferred embodiment of the invention, the error message has the same format as an analog Caller_ID message used on analog telephone lines or as a data packet that is transmitted on the signaling or D-channel of a digital telephone line.

In the example shown in FIG. 1A, the calling station 10 dials a telephone number of an intended receiving station 12. The telephone number is transmitted on the telephone line 14 to the central office 16 whereby the telephone number may undergo a format change for transmission on the high-speed communication links 18. The telephone number is received by the central office 22. If there is a problem in connecting the call to the receiving station 12, the central office 22 creates a digital error message that describes the nature of the problem with the call. The digital error message is transmitted back to the central office 16 where it is converted into the proper format to be decoded by the calling station 10.

Figure 1B:
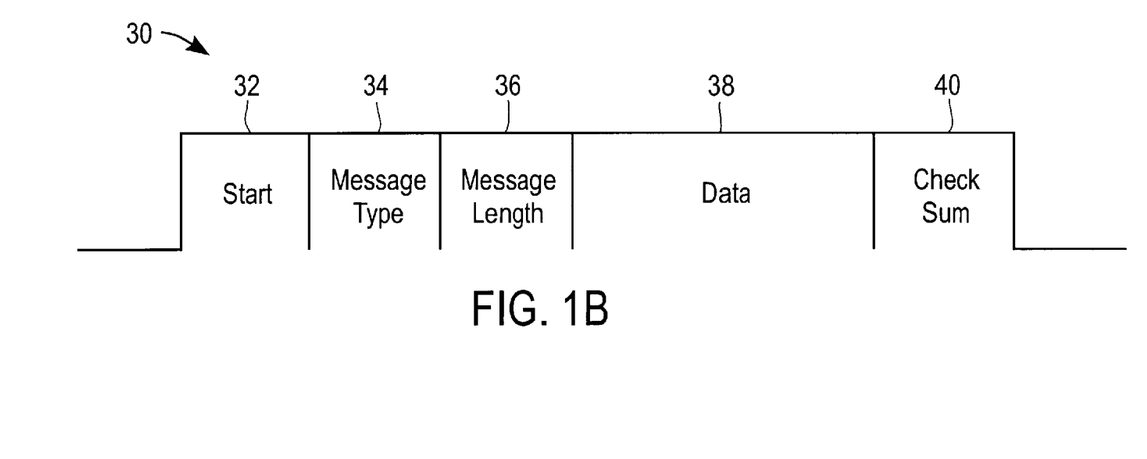
FIG. 1B illustrates the format of a digital error message that is transmitted in accordance with the present invention.

FIG. 1B illustrates one possible format for a digital error message that can be decoded by a calling station. The digital error message 30 begins with a series of start bits 32 that serve as a "channel seizure" code that alerts the calling station to the presence of the error message. Following the start bits 32 is a message type code 34 that indicates the type of information contained in the error message. For example, a change in a telephone number may have one message code, while a need to add a prefix to a telephone number may have another code, etc. Following the message type code 34 is a message length code 36 that informs the calling station how many bytes are contained in the digital error message. After the message length code 36 are the data bytes 38 that describe the error in the telephone call. Finally, a check sum 40 is included in the message to compensate for errors that may have occurred during transmission.

The format of the digital error message 30 is similar to the Caller_ID signals that are transmitted on analog telephone lines by a telephone service provider in order to alert a user to the telephone number of a calling party. However, instead of transmitting the telephone number of the calling party, the message is modified to reflect an error condition in the telephone number dialed. The format of a Caller_ID message is considered to be well-known to those of ordinary skill in the art but is more fully described in a document titled "SPCS Customer Premises Equipment Data Interface, #TR-TSY-0030" available from Bellcore at 1-800-521-CORE.

If the communication link 14 between the calling station 10 and the central office 16 is a digital telephone line such as an ISDN line, then the digital error message 30 is transmitted as a data packet on the signaling or D-channel of the line.

Once the calling station has decoded the digital error message, the appropriate action can be taken. For example, if the telephone number of the intended recipient has been changed, the calling station can update its memories and redial the correct number. Alternatively, if the error message indicates that a one must be dialed before the intended receiver can be reached, then the original telephone number can be dialed with the appropriate prefix.

Figure 2:
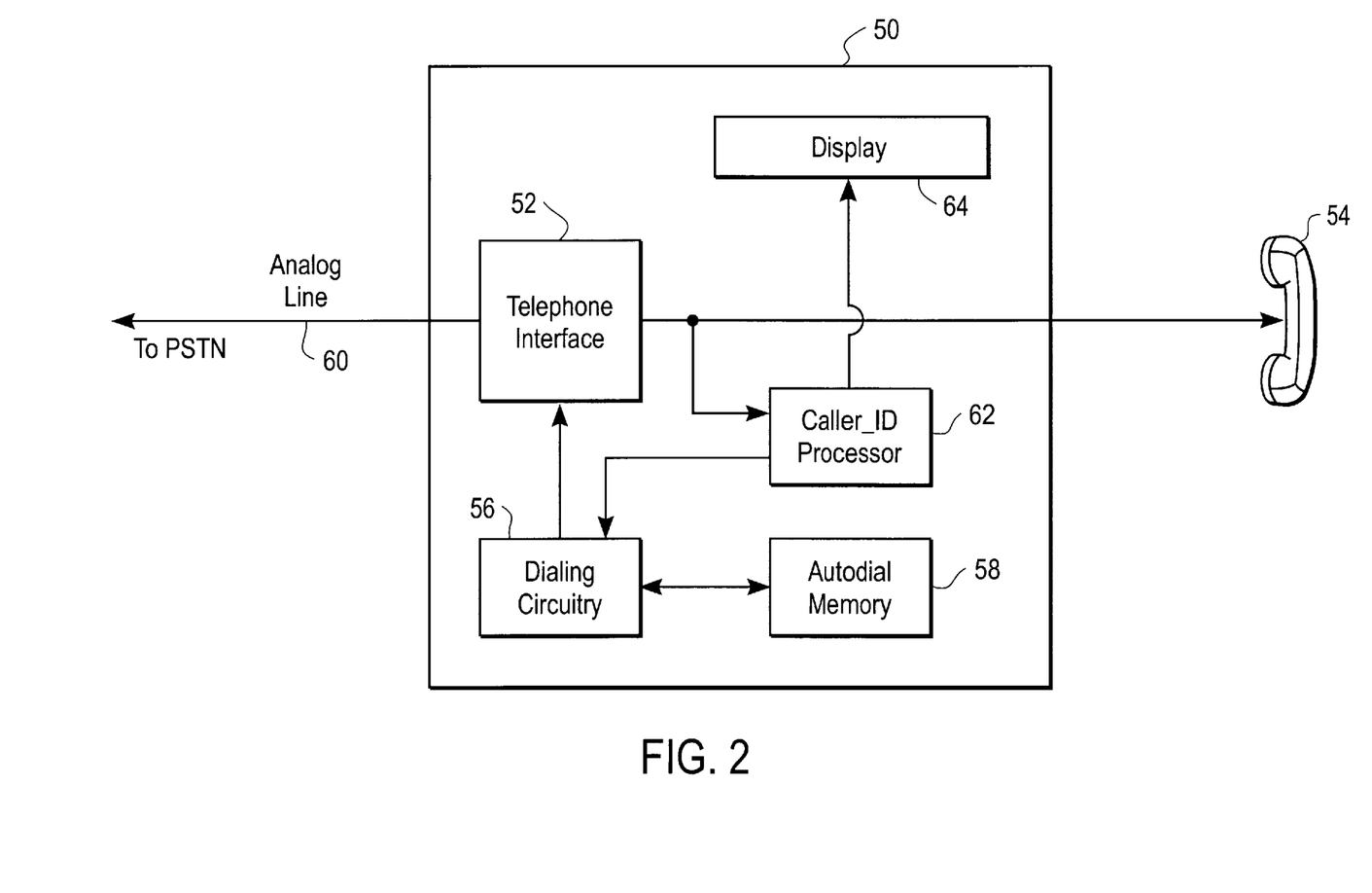
FIG. 2 is a block diagram of an analog telephone that is constructed according to the present invention.

FIG. 2 illustrates a telephone system that decodes the digital error message that is transmitted by the present invention. The telephone 50 is connected to a public switch telephone network (PSTN) on an analog telephone line 60 through a telephone interface 52. Also included in the telephone are dialing circuitry 56 and an autodial memory 58 that cause the telephone system to dial a specifically entered or stored telephone number. A handset 54 is coupled to the telephone interface to convert the electronic telephone signals received by the telephone interface into corresponding audio signals and vice versa.

To decode the digital error message shown in FIG. 1B, the telephone 50 also includes a Caller_ID processor 62 that is coupled to receive signals from the telephone interface 52. The Caller_ID processor 62 is also coupled to a display 64 and the dialing circuitry 56. The Caller_ID processor monitors the signals received on the analog telephone line 60 for the digital error messages or Caller_ID information that is transmitted from the central office. The Caller_ID processor 62 could comprise SC11211N and SC11210 integrated circuits available from Sierra Semiconductor as well as a central processor unit (CPU) to decode the digital error message.

After the digital error message has been decoded, the CPU analyzes the message to determine the appropriate action to be taken. For example, if the error message indicates that the telephone number of an intended recipient has been changed, the dialing circuitry is instructed by the Caller_ID processor to dial the new telephone number, and the new telephone number can be stored in the telephone's autodial memory 58 without a user having to manually enter the new number. In addition the content of the error message can be shown on the display 64.

Figure 3:
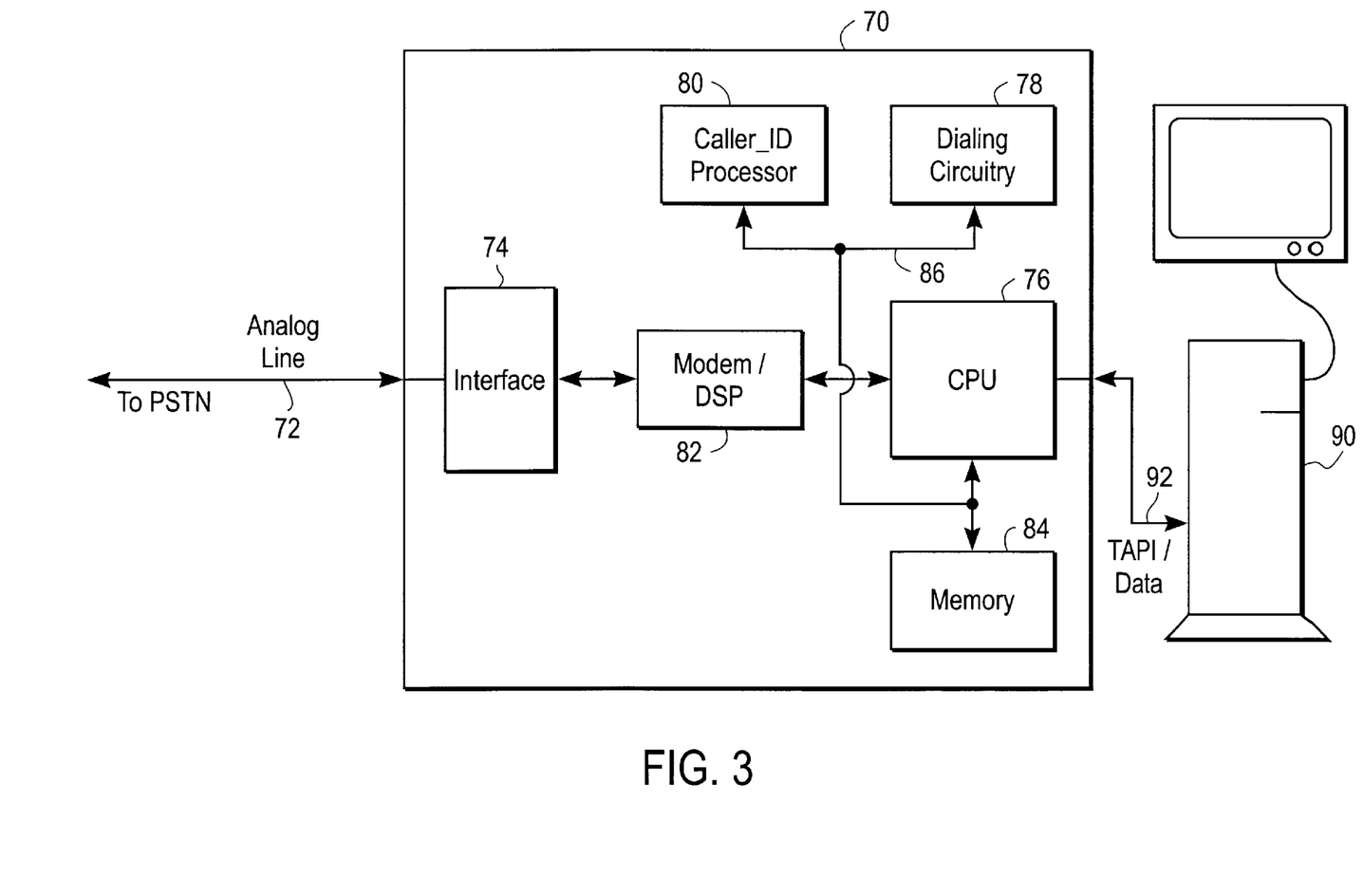
FIG. 3 is a block diagram of an analog data transmission system that is constructed according to the present invention.

As indicated above, the present invention also operates with digital data transmission systems such as facsimile machines or modems. FIG. 3 illustrates a data transmission system 70 that transmits and receives digital signals on an analog telephone line 72 that is coupled to the PSTN. The data transmission 70 includes a telephone interface 74 that connects the data transmission system to the analog telephone line. Also included are a central processing unit 76, dialing circuitry 78, a Caller_ID processor 80, a modem or digital signal processor 82 and an internal memory 84, all of which are connected together via a common databus 86.

If the data transmission system 70 is a modem, then the digital data to be transmitted are received from a computer system 90 that is coupled to the data transmission 70 through a communication link 92 which may be a dedicated cable, or a local or wide area network. Data received from the computer system 90 are transmitted by the modem or digital signal processor 82 over the analog telephone line 72 to a remote receiving station. If the data transmission system 70 is a facsimile machine, then the data to be transmitted can be received either from the computer system 90 or from an optical scanner (not shown).

If an error occurs with the call to the receiving station, the Caller_ID processor 80 receives and decodes a digital error message and forwards it to the central processing unit 76 that takes the appropriate action. The central processing unit may direct the dialing circuitry 78 to dial a new number as well as store the new number in the data transmission system's internal memory 84 or in an external memory of an intelligent switch that may be connected to the data transmission system. If the computer system is TAPI compatible, the error message may be forwarded to the computer system in order for the computer system to update its memory.

Figure 4:
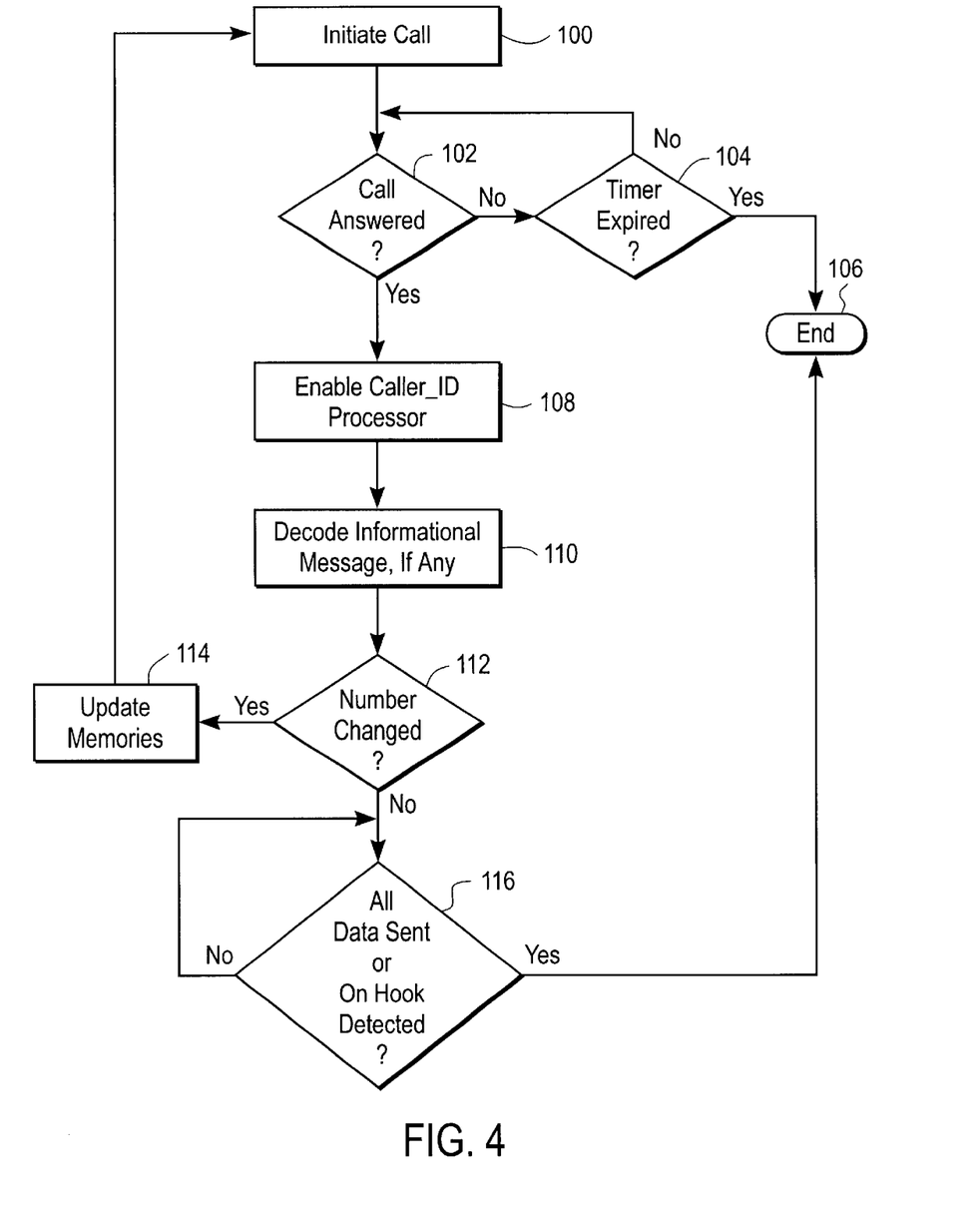
FIG. 4 is a flowchart of the steps performed by the present invention to decode a digital error message that is transmitted on an analog telephone line.

FIG. 4 is a flow chart showing the operation of the telephone system or data transmission system to decode the digital error messages when connected to an analog telephone line. Beginning with a step 100, the calling station initiates a call by placing the telephone line in the off-hook condition and dialing a telephone number. At a step 102, it is determined whether the call has been answered. If not, the central processor monitors a timer at step 104 which monitors a length of time since the call has been placed. If the timer has not expired, processing returns to step 102 to again determine if the call was answered. If the timer has expired, processing stops at a step 106.

Once the call has been answered, the central processor determines whether a digital error message has been received at a step 108. At a step 110, the received digital error message is decoded. After the message is decoded, the central processor analyzes the error message at a step 112 in order to determine the appropriate action to be taken. For example, the central processor may determine that the error message indicates that the telephone number of the desired receiving station has been changed. If so, the calling system's memories are updated at a step 114 and processing returns to step 100 to dial the new number. As will be appreciated, the steps taken at step 112 depend on the content of the error message which is determined by the central processor. Once any error message has been decoded and acted upon, call processing proceeds at a step 116 until all the data to be transmitted have been sent or an on-hook condition is detected.

Figure 5:
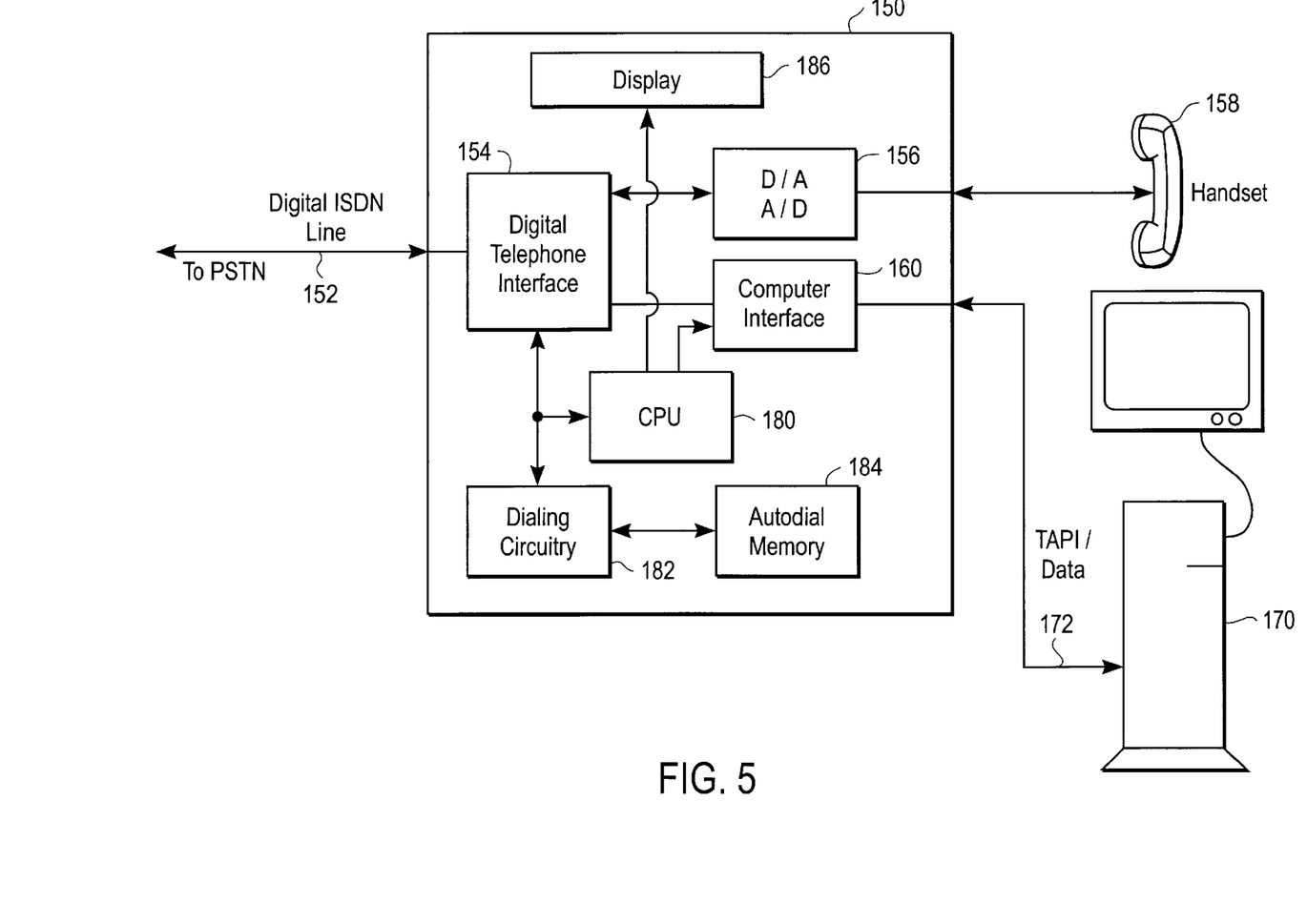
FIG. 5 is a block diagram of a telephone or data transmission system according to the present invention that transmits on a digital telephone line.

FIG. 5 illustrates a communication system 150 that decodes a digital error message from a digital telephone line, such as an ISDN line 152. The communication system 150 generally comprises a digital telephone interface 154, an analog-to-digital/digital-to-analog converter 156 and a handset 158. The digital-to-analog converter 156 converts the digital signals received on the telephone line 152 into corresponding analog signals that are played in the handset 158. Similarly, audible sounds directed into the handset 158 are converted into the appropriate digital format by the analog-to-digital converter to be transmitted on the digital telephone line 152. Also connected to the digital telephone interface 154 is a computer interface 160 that formats data received on the telephone line 152 into a form that can be transmitted to a computer system 170. The computer system 170 is coupled to the computer interface 160 by a communication link 172, which may comprise a dedicated cable, or local or wide area network.

Controlling the operation of the communication system 150 is a central processing unit (CPU) 180. Coupled to the CPU 180 and the digital telephone interface 154 is a dialing circuit 182 that may have an autodial memory 184 associated with it. A display 186 is coupled to the CPU 180 to act as an interface between the CPU 180 and a user of the communication system. The CPU 180 receives data packets that are transmitted on the signaling or D-channel of the digital telephone line 152 from the digital telephone interface 154. Data packets received on the D-channel are analyzed to determine whether they constitute a digital error message of the type shown in FIG. 1B and described above. Once a digital error message has been received and decoded, the message is analyzed by the CPU 180 for determination of how a telephone call is to be handled. For example, if the telephone number of the intended recipient has been changed, the CPU can direct the dialing circuitry to redial the appropriate number and/or store the new number in the autodial memory 184. In addition, the CPU can further forward the information received in the digital error message to the computer interface 160 and to the computer system 170.

Figure 6:
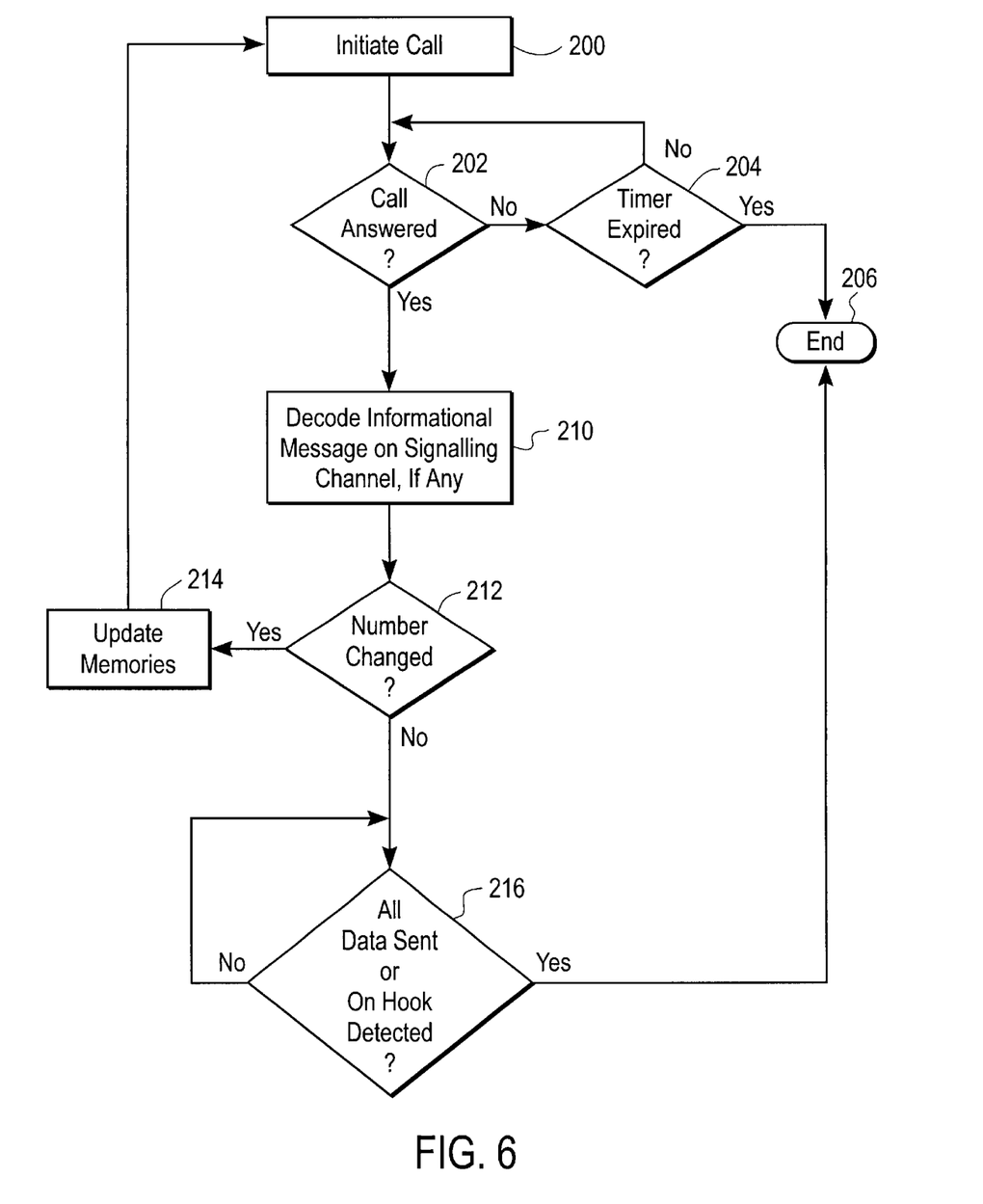
FIG. 6 is a flowchart of the steps performed by the present invention to decode a digital error message that is transmitted on a digital telephone line.

FIG. 6 illustrates the steps performed by the communication system shown in FIG. 5 in order to decode a digital error message. Beginning with a step 200, the communication system initiates a call by taking the digital telephone line off-hook and dialing an appropriate telephone number. At a step 202, it is determined whether the call has been answered. If not, processing proceeds to a step 204 wherein it is determined if a timer that monitors the length of time since the telephone number was dialed has expired. If the timer has not expired, processing returns to step 202 to again determine if the call was answered. If the timer has expired, processing ends at a step 206.

Once the call has been answered, the CPU looks for a digital error message to be received on the signaling or D-channel of the telephone line. If a digital error message is received, the message is decoded at a step 210. At a step 212, the CPU analyzes the message in order to correct a problem in the telephone call. For example, if the telephone number of the called party has been changed, then the autodial memories of the communication system are updated at step 214 and the call can be redialed using the new number at step 200. As will be appreciated, the processing that takes place at step 212 depends on the content of the error message received. Once the error message, if any, has been received and acted upon, the telephone call is processed at step 216 until either all the data to be transmitted have been sent or an on-hook condition is detected, at which time processing ends at a step 206.

As can be appreciated, the present invention allows a communication system to decode and act upon error messages that indicate a problem has occurred with a placed telephone call. By transmitting a digital error message, the communication system can readily determine the error with a telephone call and make corrections without human intervention.

Although the examples provided have shown the present invention used with fixed communication systems such as landline telephones, facsimile machines or modems, the present invention can also be used with mobile communication systems such as cellular telephones. A processing circuit can be added to a cellular telephone to decode a digital error message and take the appropriate action without user intervention.

The embodiments of the invention in which an exclusive property or privilege is claimed are defined as follows:

1. A telecommunication system, comprising:
   a telephone interface that connects the telecommunication system to a telephone line;
   dialing circuitry that dials a telephone number on the telephone line in order to place a telephone call to a remote receiver; and
   a Caller-ID processor for decoding a digital error message formatted in accordance with a communications protocol that is transmitted to the telecommunication system that indicates there is a problem with a telephone call and for directing the telecommunication system to redial the telephone call to correct the error.

2. The telecommunication system of claim 1, wherein the digital error message indicates that a telephone number has been changed and wherein said Caller-ID processor causes the dialing circuit to place another call to the remote receiver using a new telephone number.

3. The telecommunication system of claim 1, wherein the digital error message indicates that a telephone number has been changed and includes a new telephone number wherein said Caller-ID processor stores the new telephone number in a memory circuit.

4. The telecommunication system of claim 1, wherein the telecommunication system is an element of a cellular telephone.

5. A method of alerting a caller that an error has occurred with a telephone call, comprising:
   determining that an error has occurred with a telephone call placed by a caller;
   generating a Caller-ID message having a data field that indicates the nature of a problem with the call; and
   transmitting the Caller-ID message on an analog telephone line to the caller.

6. The method of claim 5, wherein the caller comprises a telecommunication system and the method further comprises decoding the Caller-ID message by the telecommunication system and, without human intervention, making corrections based on the nature of the problem with the call.

7. The method of claim 6, wherein the telecommunication system is coupled to communicate with a computer system and the method further comprises forwarding information received in the Caller-ID message to the computer system for the computer system to update its memory.

8. The method of claim 5, wherein the caller comprises a facsimile machine, the Caller-ID message includes a new telephone number and the method further comprises decoding the Caller-ID message by the facsimile machine and, without human intervention, correcting the problem with the call based on the nature of the problem with the call including dialing the new telephone number.

9. A telecommunication system configured for coupling to a computer system, the telecommunication system comprising:
   a telephone interface configured for coupling the telecommunication system to a telephone line;
   dialing circuitry configured to dial a telephone number on the telephone line in order to place a telephone call to a remote receiver; and
   a processor configured to decode a digital error message, formatted in accordance with a communications protocol, that is transmitted as a Caller-ID message to the telecommunication system and that indicates there is a problem with a telephone call due to an error condition in the telephone number dialed;
   wherein the telecommunication system is configured to forward the error message to the computer system for the computer system to update its memory.

10. The telecommunication system of claim 9, wherein the computer system is TAPI compatible and the telecommunication system comprises a computer interface that formats data received on the telephone line into a form that can be transmitted to the computer system.

11. The telecommunication system of claim 10, wherein the digital error message indicates that a telephone number has been changed and includes a new telephone number wherein the telecommunication system stores the new telephone number in a memory.

12. The telecommunication system of claim 9, wherein the digital error message indicates that a telephone number has been changed and wherein said processor causes the dialing circuit to place another call to the remote receiver using a new telephone number.

13. A facsimile machine comprising:
   a telephone interface for coupling the facsimile machine to a telephone line;
   circuitry for dialing a telephone number on the telephone line to place a call to a remote receiver; and
   a processor configured to decode a digital error message that is transmitted to the facsimile machine using a same format as a Caller-ID message and that indicates an error condition in the telephone number dialed.

14. The facsimile machine of claim 13, wherein the digital error message indicates that a telephone number has been changed and wherein the facsimile machine causes the dialing circuit to place another call to the remote receiver using a new telephone number.

15. The facsimile machine of claim 14, wherein the digital error message indicates that a telephone number has been changed and includes a new telephone number, and wherein the facsimile machine stores the new telephone number in a memory.

* * * * *